(12) United States Patent
Henry

(10) Patent No.: US 6,529,126 B1
(45) Date of Patent: Mar. 4, 2003

(54) SAFETY HELMET SYSTEM

(76) Inventor: John Junior Henry, 4115 Williston Rd., Minnetonka, MN (US) 55345

( * ) Notice: Subject to any disclaimer, the term of this patent is extended or adjusted under 35 U.S.C. 154(b) by 0 days.

(21) Appl. No.: 09/949,102

(22) Filed: Sep. 7, 2001

(51) Int. Cl.[7] .................................................. B60Q 1/50
(52) U.S. Cl. ...................... 340/467; 340/479; 340/432; 340/425.5
(58) Field of Search .................................. 340/438, 432, 340/467, 468, 475, 479, 572.2, 425.5; 2/421, 422; 362/84, 103, 105, 106, 276

(56) References Cited

U.S. PATENT DOCUMENTS

| | | | | |
|---|---|---|---|---|
| 4,760,373 A | * | 7/1988 | Reilly | 340/479 |
| 4,956,752 A | * | 9/1990 | Foglietti | 362/105 |
| 5,955,945 A | * | 9/1999 | Fuhrer | 340/479 |
| 6,097,287 A | * | 8/2000 | Lu | 340/479 |
| 6,304,804 B1 | * | 10/2001 | DeBoni | 340/476 |
| 6,348,859 B1 | * | 2/2002 | Baker | 340/479 |

* cited by examiner

Primary Examiner—Benjamin C. Lee
(74) Attorney, Agent, or Firm—Kinney & Lange, P.A.

(57) ABSTRACT

A vehicle safety system used to enhance the safety of a motorist by emitting output signals from the helmet of the motorist using a unit attached to the associated vehicle that detects the operating conditions of the associated vehicle and transmits the conditions to a second unit, attached to the helmet of the operator to emit an output signal.

23 Claims, 4 Drawing Sheets

SAFETY HELMET SYSTEM

CROSS-REFERENCE TO RELATED APPLICATION(S)

None.

BACKGROUND OF THE INVENTION

The present invention relates to safety headgear for motorists. In particular the present invention relates to safety helmets with rear mounted safety lights that emit warning signals when the brakes of an associated motor vehicle are activated and when other safety conditions regarding the associated motor vehicle occur.

Operators of personal motor vehicles, such as motorcycles, have inherent safety concerns normally not associated with other vehicles. In addition to the common hazards of minimal collision protection, a danger that is becoming more common with newer motorcycles is that, even without braking, they can decelerate very rapidly, almost as fast as braking itself. Recent models of motorcycles can decelerate as much as three times as fast as a car. This presents a dangerous situation because the brakes are not used. When braking, a motorcycle's tail brake light will illuminate to warn following traffic that the motorcycle is braking. However, if a motorcycle rapidly decelerates without braking, the brake light will not illuminate to warn others that the motorcycle is slowing down. This has resulted in collisions leading to property damage, injuries, and fatalities.

Another inherent safety concern is that the rear-mounted lights on a motorcycle are generally lower to the ground and are not always easily observed by other motor vehicles. Brake lights that are positioned higher would be more noticeable. Recognition of this problem is discussed in Reilly, U.S. Pat. No. 4,770,373.

Tail light burnouts on motor vehicles such as motorcycles is also a common problem. If a tail light on a motorcycle burns out while the motorist is riding, the motorist is placed in a dangerous situation and has no warning of the danger. When the motorist activates the brakes on the motorcycle, the tail light will not warn others of the braking.

Motorists are also placed in dangerous situations when they leave their vehicles at night. If a motorist pulls to the side of a road at night and leaves his or her motorcycle on the side of the road, traffic will only be able to see the lights of the motorcycle. The motorist will not be visible if he or she is too far from the lights of the motorcycle. Oncoming traffic will have little or no warning of the location of the motorist, and therefore, could accidentally hit the motorist.

BRIEF SUMMARY OF THE INVENTION

A vehicle safety system used to enhance the safety of motorists, which includes a first unit attached to an associated motor vehicle and a second unit attached to the rear side of a helmet. The first unit detects when a braking system of the associated vehicle is activated and when a second safety condition regarding the associated vehicle occurs, and transmits corresponding signals. The second unit receives the signals and emits a first output signal when the braking system of the associated vehicle is activated, and a second output signal when a second safety condition regarding the associated vehicle occurs.

DETAILED DESCRIPTION

Figure 1:
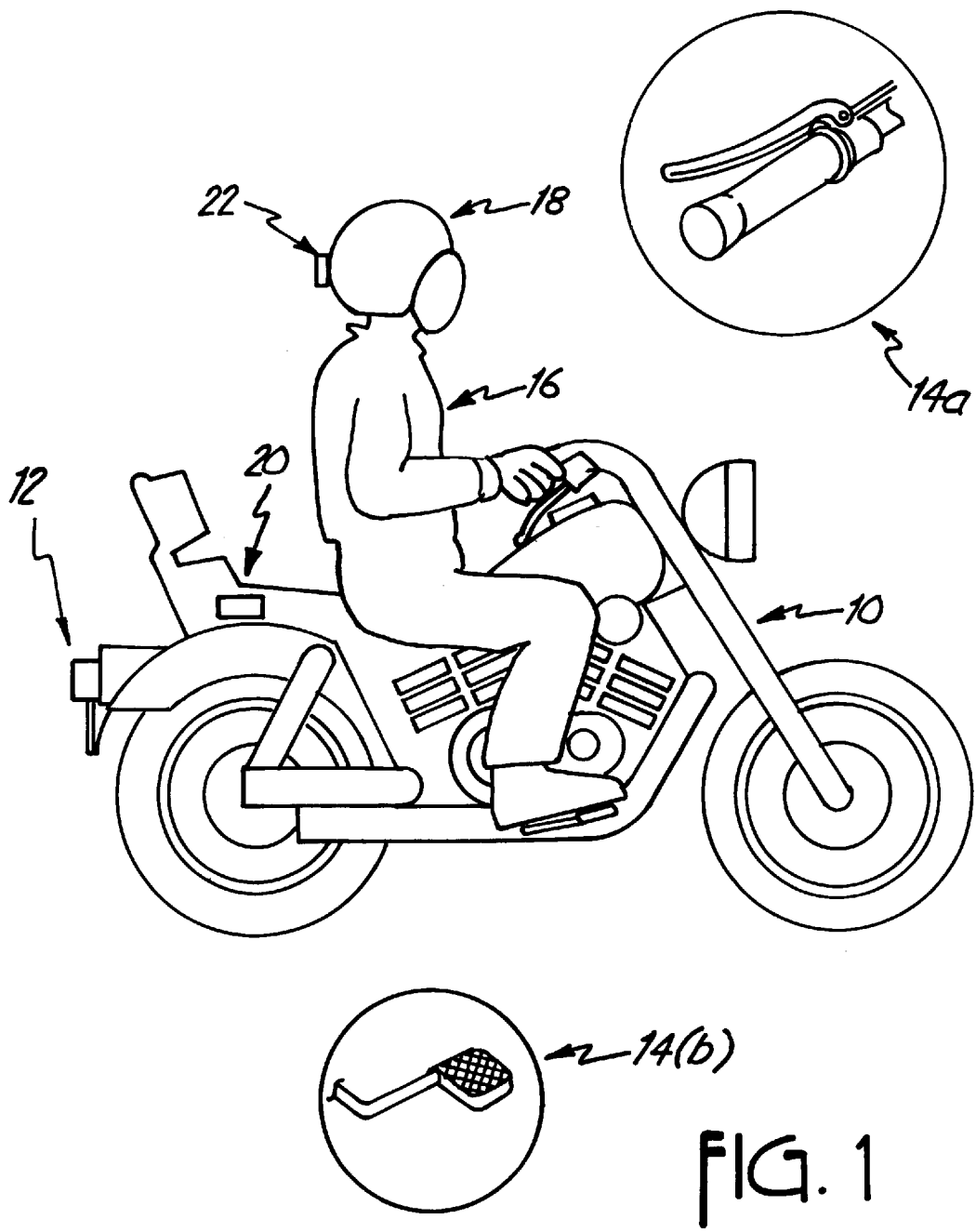
FIG. 1 is an illustration of the system of the present invention in use.

FIG. 1 is an illustration of the system of the present invention including motorcycle 10, motorcycle tail light 12, motorcycle brakes 14, motorist 16, helmet 18, local unit of present invention 20, and remote unit of present invention 22.

Tail light 12 is a standard motorcycle tail light. Brakes 14 are standard motorcycle brakes that control a standard motorcycle braking system. Hand lever brake 14*a* is a standard motorcycle hand operated lever brake, and foot pedal brake 14*b* is a standard motorcycle foot operated pedal brake. An operation of brakes 14 refers to an operation of either hand lever brake 14*a* or foot pedal brake 14*b*.

Local unit 20 is attached directly to motorcycle 10. Motorist 16 sits atop motorcycle 10 and helmet 18 is worn by motorist 16. Remote unit 22 is attached to a rear surface of helmet 18 and is located at a vertically higher position than tail light 12. When local unit 20 detects an activation of brakes 14 or an occurrence of another safety condition regarding motorcycle 10, local unit 20 transmits a signal to remote unit 22. Remote unit 22 then receives the signal and emits a corresponding output signal. These output signals provide warnings to reduce danger to motorist 16.

The type of output signal emitted by remote unit 22 depends on the signal transmitted by local unit 20, which correspondingly depends on what conditions local unit 20 detects.

A first type of output signal is emitted if brakes 14 are operated. If motorcycle 10 is braking, local unit 20 detects this and transmits a corresponding signal to remote unit 22. Remote unit 22 then emits a brake light from rear side of helmet 18 to warn following traffic that motorcycle 10 is braking. This provides an additional brake light to enhance safety to motorist 16. The elevated position of remote unit 22, relative to tail light 12, also reduces danger to motorist 16 because a brake light positioned at an elevated height is more noticeable to following traffic than a brake light at a lower elevation of tail light 12.

A second type of output signal is emitted if tail light 12 is burned out. If tail light 12 is burned out, local unit 20 detects this and transmits a corresponding signal to remote unit 22. Remote unit 22 then emits an audible output signal that warns motorist 16 of a problem regarding tail light 12. This reduces danger to motorist 16 by providing motorist 16 notice that tail light 12 is burned out.

A third type of output signal is emitted if motorcycle 10 decelerates. If motorcycle 10 is decelerating, local unit 20 detects this and transmits a corresponding signal to remote unit 22. Remote unit 22 then flashes another warning light from rear side of helmet 18 to warn following traffic that motorcycle 10 is decelerating. This reduces danger to motorist 16 by providing a visible warning to following traffic that motorcycle 10 is decelerating.

A fourth type of output signal is emitted if motorist 16 is away from motorcycle 10. If motorist 16 is wearing helmet 18 while away from motorcycle 10, local unit 22 itself detects this and flashes another warning light to allow others to see motorist 16 while away from motorcycle 10. This reduces danger to motorist 16 in poorly lit locations by providing a visible warning to others of the location of motorist 16.

Local unit 20 and remote unit 22 enhance safety to motorist 16 by detecting when motorcycle 10 is braking or when other safety conditions regarding motorcycle 10 occur, and emitting corresponding output warning signals.

Figure 2:
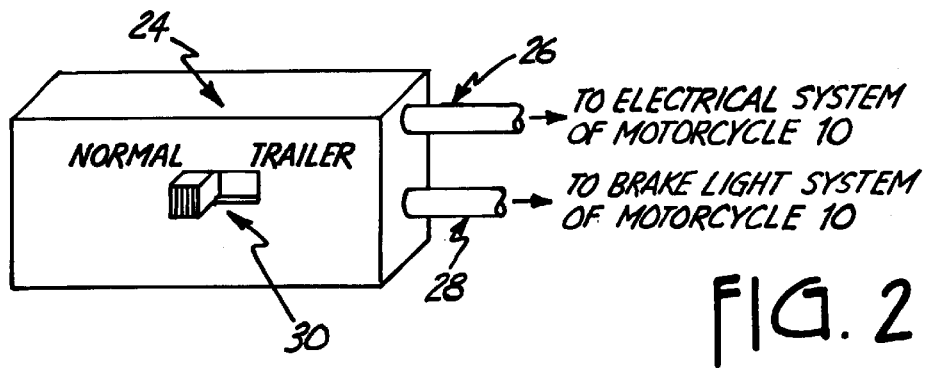
FIG. 2 is a perspective view of the local unit of the present invention.

FIG. 2 is a perspective view of external elements associated with local unit 20 including local unit casing 24, battery connection 26, brake light connection 28, and function switch 30.

Local unit casing 24 encompasses and provides protection for local unit 20. Battery connection 26 has a first end extending into local unit casing 24 and a second end connecting to electrical system of motorcycle 10. The electrical system of motorcycle 10 is a standard motorcycle battery-powered system. Battery connection 26 provides local unit 20 with electrical power. Brake light connection 28 has a first end extending into local unit casing 24 and a second end connecting to brake light system of motorcycle 10. The brake light system of motorcycle 10 is a standard motorcycle brake-light circuit, which directly connects to tail light 12 and provides tail light 12 with electrical current when brakes 14 are operated. Brake light connection 28 allows local unit 20 to monitor the electrical current sent to tail light 12 and to independently send electrical current to tail light 12.

Function switch 30 is attached to local unit casing 24. Function switch 30 allows local unit 20 to operate in two different modes: normal mode and trailer mode. Under normal mode, when local unit 20 detects that motorcycle 10 is braking or that other safety conditions regarding motorcycle 10 are occurring, local unit 20 transmits corresponding signals to remote unit 22 so that remote unit 22 can emit output signals.

Under trailer mode, motorcycle 10 is intended to be towed on a trailer of another vehicle, and local unit 20 does not send transmissions to remote unit 22. Instead, local unit 20 controls tail light 12. When local unit 20 detects that motorcycle 10 is braking or that another safety condition regarding motorcycle 10 is occurring, local unit 20 allows an electrical current to pass through brake light connection 28, to tail light 12. This allows tail light 12 to be a warning light when motorcycle 10 is being towed on a trailer and is useful with deceleration detection. Tail light 12 acts as a deceleration warning light. The deceleration warning light warns following traffic when a trailer and vehicle pulling the trailer decelerate. An additional benefit is, because motorcycle 10 is supported on a trailer, tail light 12 is at an elevated position allowing tail light 12 to be more noticeable to following traffic.

In another embodiment, function switch 30 may also operate in a third mode: dual mode. When function switch 20 is set at dual mode, local unit 20 allows both local unit 20 and tail light 12 to simultaneously emit warning lights. When local unit 20 detects that motorcycle 10 is braking or that another safety condition regarding motorcycle 10 is occurring, local unit 20 transmits corresponding signals to remote unit 22 so that remote unit 22 can emit output signals and local unit 20 also allows an electrical current to pass through brake light connection 28, to tail light 12. This allows both remote unit 22 and tail light 12 to simultaneously provide warning lights and is useful with deceleration detection.

Local unit 20 provides for the ability to detect when motorcycle 10 is braking or when other safety conditions regarding motorcycle 10 occur, and to either transmit corresponding signals to remote unit 22 or directly send corresponding signals to tail light 12.

Figure 3:
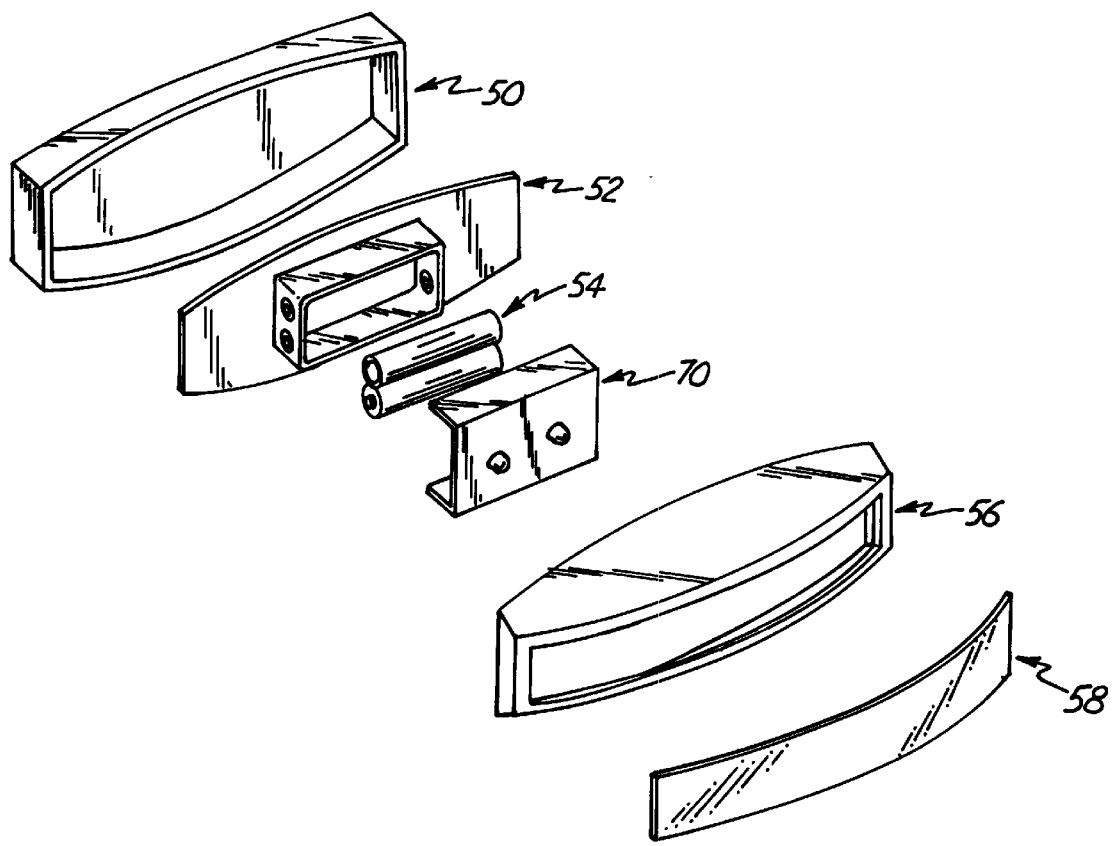
FIG. 3 is an exploded view of the remote unit of the present invention.

FIG. 3 is an exploded view of remote unit 22 containing remote unit base 50, internal circuitry 52, battery 54, light emitting diode (LED) display 70, remote unit casing 56, and translucent cover 58.

Remote unit base 50, is the portion of remote unit 22 that is attached to the rear of helmet 18. Internal circuitry 52 is attached inside remote unit base 50. Battery 54 attaches to internal circuitry 52, provides power for remote unit 22, and is replaceable when expended. LED display 70 is also attached to internal circuitry 52. Remote unit casing 56 is attached to remote unit base 50 and completely encases and protects internal circuitry 52, battery 54, and LED display 70. Remote unit casing 56 is attached to remote unit base 50 such that remote unit casing 56 is detachable and reattachable to allow access inside remote unit 22 to reach and replace battery 54.

Remote unit casing 56 provides protection for remote unit 22 and also contains an opening that is covered by translucent cover 58. Translucent cover 58 consists of a translucent material to allow light from LED display 70 to be visibly observable, and also provides protection for remote unit 22.

When a signal is transmitted from local unit 20 to remote unit 22, internal circuitry 52 receives and interprets the signal. If the signal regards braking or deceleration of motorcycle 10, then internal circuitry 52 directs LED display 70 to flash to provide a warning of the braking or deceleration. This reduces danger to motorist 16 by providing visible warnings to following traffic that motorcycle 10 is braking or decelerating.

Remote unit 22 provides for the ability to receive transmitted signals from local unit 20 and emit corresponding output warning signals to enhance safety to motorist 16 without the need of a burdensome wire connection.

Figure 4:
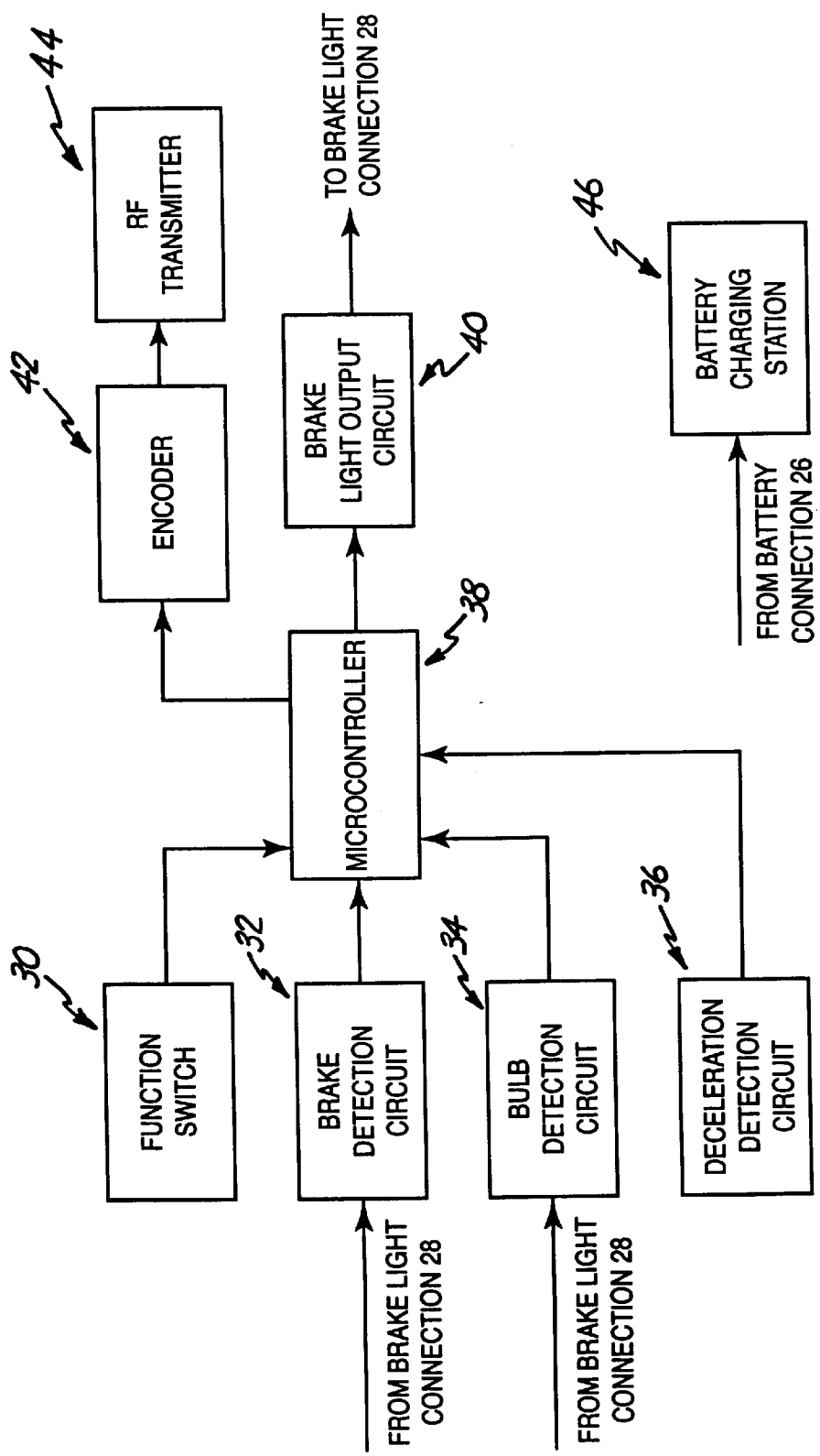
FIG. 4 is a block diagram of the local unit of the present invention.

FIG. 4 is a block diagram of local unit 20, located within local unit casing 24, containing function switch 30, brake detection circuit 32, bulb detection circuit 34, deceleration detection circuit 36, microcontroller 38, brake light output circuit 40, encoder 42, radio frequency (RF) transmitter 44, and battery charging station 46.

Function switch 30, brake detection circuit 32, bulb detection circuit 34, and deceleration detection circuit 36 are connected to and send signals to microcontroller 38. Brake detection circuit 32 and bulb detection circuit 34 have second ends connected to and receive electrical current from brake light connection 28. Microcontroller 38 is connected to and sends signals to brake light output circuit 40 and encoder 42. Brake light output circuit 40 has a second end connected to brake light output 28 and sends electrical current to tail light 12. Encoder 42 is connected to and sends signals to RF transmitter 44. Battery charging station 46 is connected to battery connection 26.

Microcontroller 38 is programmed to detect and interpret signals from function switch 30, brake detection circuit 32, bulb detection circuit 34, and deceleration detection circuit 36. When a signal is received, microcontroller 38 sends a corresponding signal to encoder 68 or brake light output circuit 40.

Function switch 30, based on what mode is selected, directs where microcontroller 38 sends signals. When set at normal mode, function switch 30 directs microcontroller 38 to send signals to encoder 42. This allows local unit 20 to transmit signals to remote unit 22. When set at trailer mode, function switch 30 directs microcontroller 38 to send signals to brake light output circuit 40. This allows local unit 20 to control tail light 12 and is useful while motorcycle 10 is being towed on a trailer.

Brake detection circuit 32 detects when motorcycle 10 is braking. When brakes 14 are operated, an electrical current is sent through the brake light circuit of motorcycle 10, allowing tail light 12 to flash. This electrical current is also sent through brake light connection 28 to brake detection circuit 32. Brake detection circuit 32 constantly monitors for this electrical current. If brake detection circuit 32 detects an electrical current, brake detection circuit 32 sends a signal to microcontroller 38 that motorcycle 10 is braking.

Bulb detection circuit 34 detects when tail light 12 is burned out. Bulb detection circuit 34 detects a change in voltage across a low-value resistor installed in the brake light circuit of motorcycle 10. At predetermined periods, including when motorcycle 10 is started up, local unit 20 flashes tail light 12. If tail light 12 is burned out, no electrical current will pass through the brake light circuit, and there will not be a drop in voltage across the low-value resistor. During these periods when local unit 20 flashes tail light 12, bulb detection circuit 34 monitors the voltage across the low-value resistor. If bulb detection circuit 34 detects no change in voltage across the low-value resistor, bulb detection circuit 34 sends a signal to microcontroller 38 that tail light 12 is burned out.

Deceleration detection circuit 36 detects the rate of deceleration when motorcycle 10 decelerates and incorporates the use of a deceleration detector. An efficient type of deceleration detector is an accelerometer, which measures acceleration and deceleration by measuring force exerted on an object, such as a suspended weight, when acceleration or deceleration occurs. The force measured is created by an inertial resistance to the acceleration or deceleration of the object. When acceleration or deceleration occurs, the object shifts from its neutral position because of its inertia. The distance the weight moves is measured and calculated as an inertial force.

The inertial force is then compared to a force threshold. The force threshold is a parameter programmed into deceleration detection circuit 36. The purpose of the force threshold is so that small rates of deceleration do not trigger a deceleration warning light. As motorcycle 10 decelerates, deceleration detection circuit 36 measures and calculates the corresponding inertial force. Deceleration detection circuit 36 then compares the inertial force to the force threshold. If the inertial force is greater than the force threshold, then deceleration detection circuit 36 sends a signal to microcontroller 38 that motorcycle 10 is decelerating.

In another embodiment, the deceleration detector is a solid-state accelerometer.

In another embodiment, the deceleration detector is a spring mass system. A mass spring system incorporates a conductive weight that compresses against a spring when deceleration occurs until the conductive weight comes in contact with a conductive rod, located at the opposite end of the spring. The spring and conductive weight are calibrated so that the conductive weight contacts the conductive rod when a deceleration threshold is reached. The purpose of the deceleration threshold is so that small rates of deceleration do not trigger a deceleration warning light.

As motorcycle 10 decelerates, the conductive weight of the spring mass system compresses the spring. If motorcycle 10 decelerates fast enough such that the conductive weight compresses the spring to the point where the conductive weight comes into contact with the conductive rod, then deceleration detection circuit 36 sends a signal to microcontroller 38 that motorcycle 10 is decelerating.

The force threshold and deceleration threshold perform the same function. They prevent deceleration detection circuit 36 from sending signals to microcontroller 38 and correspondingly prevent deceleration warning lights from being emitted, unless motorcycle 10 is decelerating rapidly.

When microcontroller 38 receives a signal from brake detection circuit 32, bulb detection circuit 34, or deceleration detection circuit 36, microcontroller 38 performs an operation depending on the mode setting of function switch 30. If under normal mode, microcontroller 38 sends a signal to encoder 42. If under trailer mode, microcontroller 38 sends a signal to brake light output circuit 40.

Brake light output circuit 40 allows local unit 20 to control tail light 12 under trailer mode. If microcontroller 38 sends a signal to brake light output circuit 40, then brake light output circuit 40 allows an electrical current to flow from battery connection 26, through brake light connection 28, to tail light 12. The use of brake light output circuit 40 is useful in conjunction with deceleration detection. Tail light 12 is allowed to act as a deceleration warning light when motorcycle 10 is towed on a trailer.

The electrical current sent through brake light connection 28 may also be pulsed, that is, brake light output circuit 40 can direct the electrical current to flow intermittently, allowing pulses of electrical current to reach tail light 12. This results in a flashing effect from tail light 12 and is useful to distinguish the deceleration warning light from a continuously illuminated brake light.

Encoder 42 is a signal encoder, which is commonly used in remote control systems. A signal encoder digitally encodes signals before the signals are sent to a transmitter, such as RF transmitter 44. The signals are encoded so that signals sent by the transmitter are only interpreted by a corresponding decoder. An encoder and corresponding decoder are set to identical digital encoding codes. Only signals from encoders and decoders with identical digital encoding/decoding codes may be decoded for use. This prevents signals transmitted from interfering with unwanted devices that receive the signals. When microcontroller 38 sends a signal to encoder 42, such as a signal that brakes 14 are activated or motorcycle 10 is decelerating, encoder 42 encodes the signal and then sends the encoded signal to RF transmitter 44.

RF transmitter 44 is a wireless communication transmitter. Transmitters receive encoded signals from encoders and transmit the encoded signals via radio frequencies. When RF transmitter 44 receives an encoded signal from encoder 42, RF transmitter 44 transmits the signal. The signal is then received by remote unit 22. The use of transmitter 44 avoids any need for a burdensome wire connection between local unit 20 and remote unit 22 while still allowing a reliable signal transfer.

Battery charging station 46 recharges batteries for remote unit 22. Battery charging station 46 receives power to charge batteries from battery connection 26. When the batteries are placed in battery charging station 46, battery connection 26 provides an electrical current to recharge the batteries. These batteries are used to power remote unit 22. This allows motorist 16 to always have recharged batteries for use in remote unit 22.

As previously mentioned, local unit 20 provides for the ability to detect when motorcycle 10 is braking or when other safety conditions regarding motorcycle 10 occur, and to either transmit corresponding signals to remote unit 22 or directly send corresponding signals to tail light 12.

Figure 5:
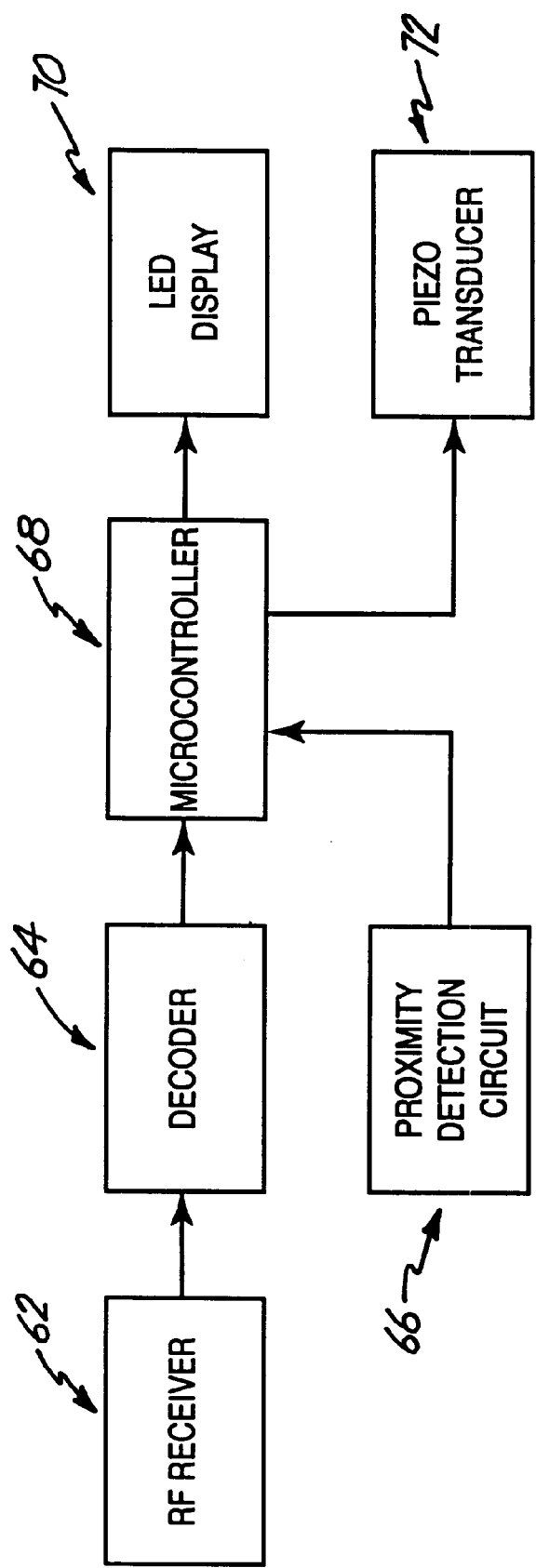
FIG. 5 is a block diagram of the remote unit of the present invention.

FIG. 5 is a block diagram of elements of remote unit 22, located within remote unit casing 56, containing radio frequency (RF) receiver 62, decoder 64, proximity detection circuit 66, microcontroller 68, LED display 70, and piezo transducer 72. RF receiver 62, decoder 64, proximity detection circuit 66, microcontroller 68, and piezo transducer 72 are components of internal circuitry 52.

RF receiver 62 is connected to and sends encoded signals to decoder 64. Decoder 64 and proximity detection circuit 66 are connected to and send signals to microcontroller 68. Microcontroller 68 is connected to and sends signals to LED display 70 and piezo transducer 72.

Microcontroller 68 is programmed to detect and interpret the signals sent from decoder 64 and proximity detection circuit 66. Based on the signal received, microcontroller 68 produces an output signal. If the signal received relates to braking, a deceleration warning, or a proximity warning then a corresponding signal is sent to LED display 70. If the signal relates to tail light 12 being burned out, then a signal is sent to piezo transducer 72.

RF receiver 62 is a radio frequency receiver that receives radio frequency signals sent from RF transmitter 44 and converts the radio frequency signals to electrical signals. The electrical signals are then decoded by decoder 64. In order to decode encoded signals sent from local unit 20, decoder 64 and encoder 42 must have identical digital encoding/decoding codes. The signals that result from the decoding are then sent from decoder 64 to microcontroller 68.

Proximity detection circuit 66 is a signal sensor that constantly monitors the transmission field strength between local unit 20 and remote unit 22. The purpose of proximity detection circuit 66 is to enhance safety to motorist 16 by providing a warning light to show the location of motorist 16 when motorist 16 is away from motorcycle 10. This is useful in poorly lit conditions when motorist 16 is away from motorcycle 10 and not readily visible to traffic.

As proximity detection circuit 66 detects the field strength between local unit 20 and remote unit 22, proximity detection circuit 66 compares the signal to a field strength threshold. The field strength threshold is a field strength parameter, programmed into proximity detection circuit 66, which determines what distance remote unit 22 must be from motorcycle 10 for remote unit 22 to flash a warning light. The transmission field strength between local unit 20 and remote unit 22 diminishes as remote unit 22 moves away from local unit 20. The purpose of the field strength threshold is so that the warning light does not constantly emit while motorist 16 is riding motorcycle 10. As motorist 16, while wearing helmet 18, moves away from motorcycle 10, proximity detection circuit 66 detects the field strength between local unit 20 and remote unit 22 and compares the field strength to the field strength threshold. When the field strength becomes less than the field strength threshold, proximity detection circuit 66 sends a signal to microcontroller 68 that motorist 16 is away from motorcycle 10.

When microcontroller 68 receives a signal from decoder 64 or proximity sensor 66, then depending on the signal received, microcontroller 68 sends a signal to either LED display 70 or piezo transducer 72. If the signal received regards braking, a deceleration warning, or a proximity warning, then microcontroller 68 sends a corresponding signal to LED display 70. If the signal received regards tail light 12 being burned out, then microcontroller 68 sends a signal to piezo transducer 72.

LED display 70 emits warning lights from remote unit 22 to reduce danger to motorist 16 by providing visual warnings to following traffic. When LED display 70 receives a signal from microcontroller 68, LED display emits a warning light. Electrical current for LED display 70 is provided by battery 54. Therefore, when microcontroller sends a signal regarding motorcycle 10 braking, deceleration detection, or proximity detection, LED display 70 will correspondingly emit a brake warning light, deceleration warning light, or proximity warning light.

The light from LED display may also be flashed. LED display 70 may pulse the electrical current sent from battery 54 to LED display 70. This results in a flashing effect from LED display 70 and is useful with deceleration and proximity warnings to distinguish them from a continuously illuminated brake light.

Piezo transducer 62 is emits an audible output when an electrical current is applied, and is useful with a warning that tail light 12 is burned out. When tail light 12 is burned out, microcontroller 68 sends a signal to piezo transducer 62. Piezo transducer 62 then produces an audible output that motorist 16 can hear. Electrical current for piezo transducer 62 is provided by battery 54. The audible output warns motorist 16 that tail light 12 is burned out and therefore, decreases danger to motorist 16 by providing notice of problematic tail light 12.

Remote unit 22 provides the ability to receive signals transmitted from local unit 20 without the use of burdensome wiring and to emit output warning signals to enhance safety to motorist 16.

For an example of an application of the present invention, assume that motorcycle 10 decelerates without motorist 16 applying brake 14 and while function switch 30 is set at normal mode. Deceleration detection circuit 36, incorporating an accelerometer, detects the rapid deceleration, measures and calculates the inertial force, and compares the inertial force to a force threshold. If motorcycle 10 is decelerating fast enough so that the inertial force is greater than the force threshold, then deceleration detection circuit 36 sends a signal to microcontroller 38 that motorcycle 10 is decelerating. Microcontroller 38 detects and interprets the signal and then, because function switch 30 is set at normal mode, sends a signal to encoder 42. Encoder 42 then digitally encodes the signal and sends the encoded signal to RF transmitter 44. RF transmitter 44 then transmits the encoded signal from local unit 20.

The encoded signal is intercepted by RF receiver 62 in remote unit 22 and decoded by decoder 64. The decoded signal is then sent from decoder 64 to microcontroller 68. Microcontroller 68 detects the signal and identifies it as relating to deceleration. Because the signal relates to deceleration, microcontroller 68 sends a corresponding signal to LED display 70. LED display 70 then flashes a warning light oriented behind motorist 16. Traffic following motorist 16 will be able to observe the flashing warning light and identify that motorcycle 10 is decelerating. This decreases danger to motorist 16 by providing notice to following traffic of the rapid deceleration.

Local unit 20 and remote unit 22 of the present invention decrease danger to motorist 16 by providing warnings of braking and other safety conditions regarding motorcycle 10. This in turn decreases the risk of loss of property, injuries, and, fatalities.

Although the present invention has been described with reference to preferred embodiments, workers skilled in the art will recognize that changes may be made in form and detail without departing from the spirit and scope of the invention. For instance, though being discussed as being used with a motorcycle, the present invention may be utilized along with other personal motor vehicles, such as snowmobiles.

What is claimed is:

1. A vehicle safety system comprising:
   a first unit, attached to an associated vehicle, that detects operating conditions regarding the associated vehicle, and transmits signals based on the operating conditions detected, wherein the operating conditions comprise an operation of a braking system of the associated vehicle and deceleration of the associated vehicle;
   a second unit, attached to a helmet that receives the signals from the first unit and emits output signals based on the signals received.

2. A vehicle safety system of claim 1, wherein the first unit comprises:
   a brake detection circuit;
   a deceleration detection circuit;
   a microcontroller responsive to the brake detection circuit and the deceleration detection circuit for producing an output based upon signals received from the brake detection circuit and the deceleration detection circuit;
   an encoder responsive to the output for producing encoded signals; and
   a radio-frequency transmitter responsive to the encoded signals for transmitting signals.

3. A vehicle safety system of claim 2, wherein the operating conditions detected by the first unit further comprise tail light burnout of the associated vehicle, wherein the first unit further comprises a bulb detection circuit, wherein the microcontroller is responsive to the bulb detection circuit, wherein the microcontroller produces an output based upon a signal received from the bulb detection circuit, and wherein the second unit emits an audible output signal when the first unit detects a tail light burnout of the associated vehicle.

4. A vehicle safety system of claim 2, wherein the first unit further comprises:
   a function switch, which the microcontroller is responsive to, for directing where the microcontroller sends the output; and
   a brake light output circuit responsive to the output for producing a signal to control a brake light of the associated vehicle.

5. A vehicle safety system of claim 2, wherein the first unit further comprises a battery charging station.

6. A vehicle safety system of claim 1, wherein the second unit comprises:
   a radio-frequency receiver responsive to the signals transmitted from the first unit for producing an encoded signal based upon the signal received;
   a decoder responsive to the encoded signal for producing a decoded signal;
   a microcontroller responsive to the decoded signal for producing an output based on the decoded signal received; and
   a light emitting device responsive to the output for producing visible warning signals.

7. A vehicle safety system of claim 6, wherein the second unit further comprises a transducer responsive to the output for producing audible warning signals.

8. A vehicle safety system of claim 6, wherein the second unit further comprises a proximity detection circuit, wherein the microcontroller of the second unit is responsive to the proximity detection circuit, and wherein the microcontroller of the second unit produces an output based upon a signal received from the proximity detection circuit.

9. A vehicle safety system comprising:
   a transmitter mounted on a vehicle for transmitting signals in response to detected brake operation and detected vehicle deceleration; and
   a receiver mounted on a helmet for producing visible warning signals in response to the signals received from the transmitter.

10. A vehicle safety system of claim 9, wherein the transmitter transmits signals in response to detected burnout of tail light of the vehicle, and wherein the receiver produces audible warning signals in response to the signals received from the transmitter indicating a detected burnout of tail light of the vehicle.

11. A vehicle safety system of claim 9, wherein the receiver produces visible warning signals in response to a proximity detection, so that the visible warning signals are produced when a motorist wearing the helmet is away from the vehicle.

12. A vehicle safety system comprising:
    a detection unit mounted to a vehicle comprising:
       a brake detection circuit;
       a deceleration detection circuit;
       a microcontroller responsive to the brake detection circuit and the deceleration detection circuit for producing a first signal when receiving a signal from the brake detection circuit and a second signal when receiving a signal from the deceleration detection circuit;
    an output unit, mounted to a helmet, responsive to the first and second signals for emitting warning signals based on the first and second signals received.

13. A vehicle safety system of claim 12, wherein the detection unit further comprises a bulb detection circuit, wherein the microcontroller is responsive to the bulb detection circuit, wherein the microcontroller produces a third signal when receiving a signal from the bulb detection circuit; and the output unit emits audible warning signals in response to the third signal.

14. A vehicle safety system of claim 12, wherein the output unit comprises a proximity detection circuit, wherein the output unit is responsive to the proximity detection circuit, and wherein the output unit emits a warning signal when receiving a signal from the proximity detection circuit indicating that a motorist wearing the helmet is away from the vehicle.

15. A vehicle safety system comprising:
    a first unit, mounted on an associated vehicle, comprising:
       a deceleration detection circuit responsive to deceleration of the associated vehicle;
       a function switch;
       a microcontroller responsive to the deceleration detection circuit and the function switch for producing an output based on the signals received from the deceleration detection circuit and the function switch;
       an encoder responsive to the output from the microcontroller for producing encoded signals;
       a radio-frequency transmitter responsive to the encoder for transmitting the encoded signals; and
       a brake light output circuit responsive to the output from the microcontroller for producing a signal to control a brake light of the associated vehicle;
       wherein the function switch directs the microcontroller to send the output to the radio-frequency transmitter or the brake light output circuit;

a second unit, mounted on a helmet, comprising:
- a radio-frequency receiver responsive to the signals transmitted from the first unit for producing an encoded signal based upon the signal received;
- a decoder responsive to the encoded signal from the radio-frequency receiver for producing a decoded signal;
- a microcontroller responsive to the signal from the decoder for producing an output based on the signal received;
- a light emitting device responsive to the output for producing visible warning signals.

16. A vehicle safety system of claim 15 wherein the first unit further comprises a bulb detection circuit responsive to a taillight burnout of the associated vehicle, wherein the microcontroller is responsive to the bulb detection circuit, wherein the microcontroller produces an output based upon a signal received from the bulb detection circuit, and wherein the second unit emits an audio output signal in response to the first unit detecting a taillight burnout of the associated vehicle.

17. A vehicle safety system of claim 15 wherein the first unit further comprises a battery charging station.

18. A vehicle safety system of claim 15 wherein the second unit further comprises a proximity detection circuit, wherein the microcontroller of the second unit is responsive to the proximity detection circuit, and wherein the microcontroller of the second unit produces an output based upon a signal received from the proximity detection circuit.

19. A vehicle safety system of claim 15 wherein the second unit further comprises a transducer responsive to the output of the microcontroller for producing audible warning signals.

20. A vehicle safety system comprising:
a first unit, attached to an associated vehicle, comprising a signal communicator for transmitting signals; and
a second unit, attached to a helmet; comprising:
- proximity detection circuit, responsive to the transmitted signal from the first unit, for producing a signal based upon the transmitted signal received;
- a microcontroller responsive to the signal from the proximity detection circuit for producing an output based on the signal received from the proximity detection circuit; and
- a light emitting device responsive to the output from the microcontroller for producing visible warning signals to indicate the helmet is no longer proximate the vehicle.

21. A vehicle safety system of claim 20 wherein the first unit is responsive to an operation of a braking system of the associated vehicle, and wherein the signal communicator transmits signals regarding the operation of the braking system of the associated vehicle.

22. A vehicle safety system of claim 20 wherein the first unit is responsive to deceleration of the associated vehicle, and wherein the signal communicator transmits signals regarding the deceleration of the associated vehicle.

23. A vehicle safety system of claim 20 wherein the second unit further comprises a transducer responsive to the output of the microcontroller for producing audible warning signals.

* * * * *

UNITED STATES PATENT AND TRADEMARK OFFICE
CERTIFICATE OF CORRECTION

PATENT NO.   : 6,529,126 B1
DATED        : March 4, 2003
INVENTOR(S)  : John Junior Henry It is certified that error appears in the above-identified patent and that said Letters Patent is hereby corrected as shown below:

<u>Column 12,</u>
Line 5, before "proximity", insert -- a --

Signed and Sealed this

Twenty-sixth Day of July, 2005

JON W. DUDAS
*Director of the United States Patent and Trademark Office*